United States Patent [19]
Cosier et al.

[11] 3,756,399
[45] Sept. 4, 1973

[54] SKIN PACKAGE FOR AN ARTICLE AND METHOD OF FORMING THE PACKAGE

[75] Inventors: Richard A. Cosier; Alan K. McDonnell, both of Woodridge, Ill.

[73] Assignee: Western Electric Company, Incorporated, New York, N.Y.

[22] Filed: Aug. 30, 1971

[21] Appl. No.: 176,168

[52] U.S. Cl........ 206/80 A, 174/52 PE, 206/46 ED, 206/65 F, 53/30
[51] Int. Cl...................... B65d 73/00, B65d 85/62
[58] Field of Search............... 206/80 A, 78 B, 65 F, 206/65 R, 65 S, 46 ED, 46 F, 45.33; 53/30; 229/3.5 R; 174/52 PE, 35 MS; 29/526, 527, 525

[56] References Cited
UNITED STATES PATENTS

| | | | |
|---|---|---|---|
| 2,861,404 | 11/1958 | Stratton, Jr. | 206/80 A |
| 3,436,467 | 4/1967 | Smith, Jr. | 174/35 MS |
| 2,859,152 | 11/1958 | Markus et al. | 206/78 B |
| 3,529,718 | 9/1970 | Zaremski | 206/78 B |
| 3,616,533 | 11/1971 | Heap et al. | 174/52 PE |

Primary Examiner—William T. Dixson, Jr.
Attorney—W. M. Kain, R. P. Miller et al.

[57] ABSTRACT

An article having irregular protrusions on one side, such as a printed circuit board having electrical components mounted thereon, is packaged by positioning it on a backing member with the protrusions facing outward from the backing member, and then placing a relatively cool inner sheet of thermoplastic film over the one side of the article. Next, a heated outer sheet of thermoplastic film is moved downward over the inner sheet and vacuum is applied to the opposite side of the backing member to draw the two sheets into tight-fitting relationship with respect to the article and to draw the heated outer sheet into engagement with portions of the backing member, whereby the heated outer sheet bonds to the cool inner sheet and to the backing member. In the completed package the inner sheet extends at least into engagement with the backing member around the periphery of the article, and the two bonded sheets form reinforcing "tents" or ribs between certain of the article protrusions, and between these protrusions and the periphery of the article.

13 Claims, 4 Drawing Figures

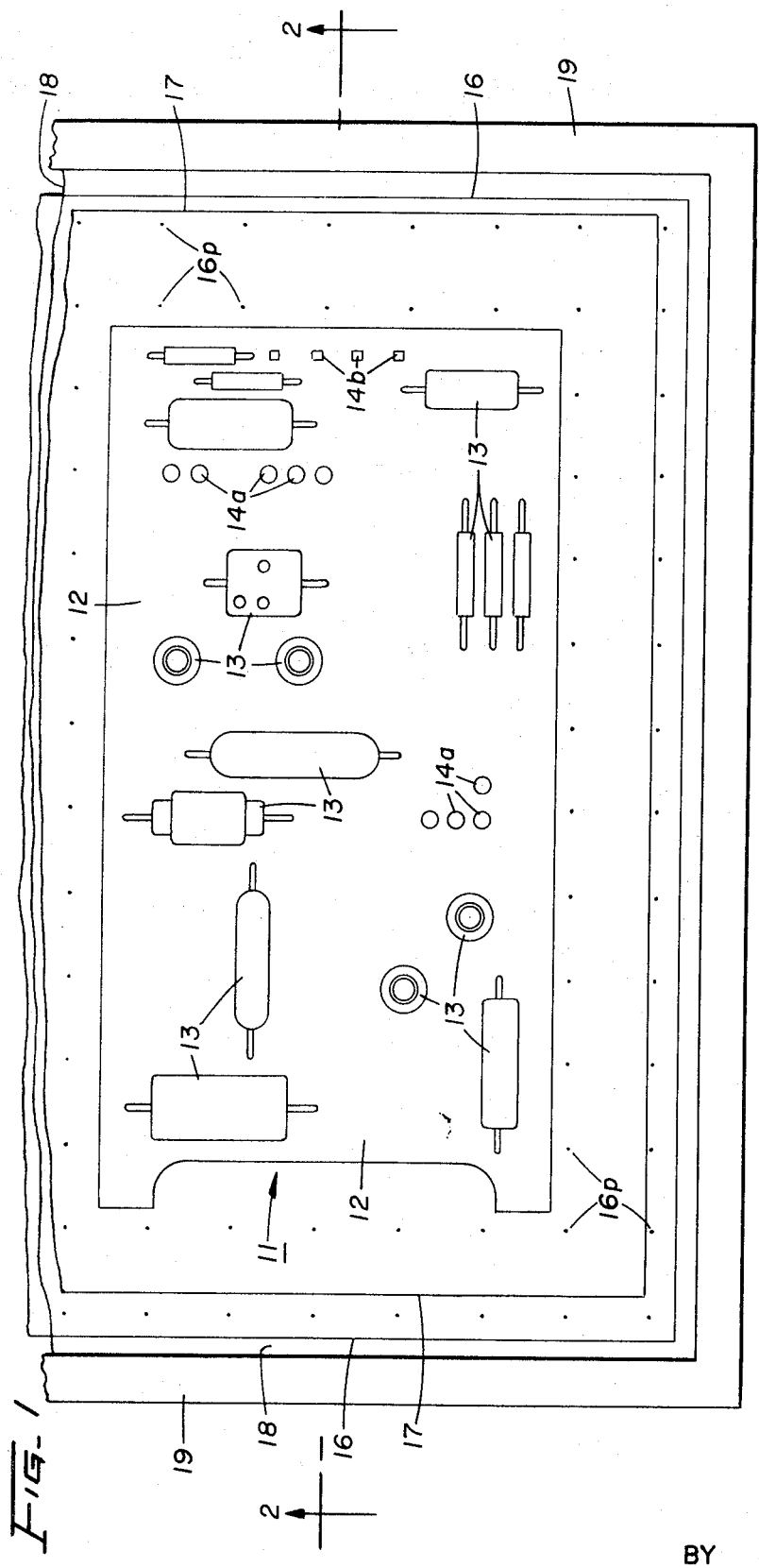
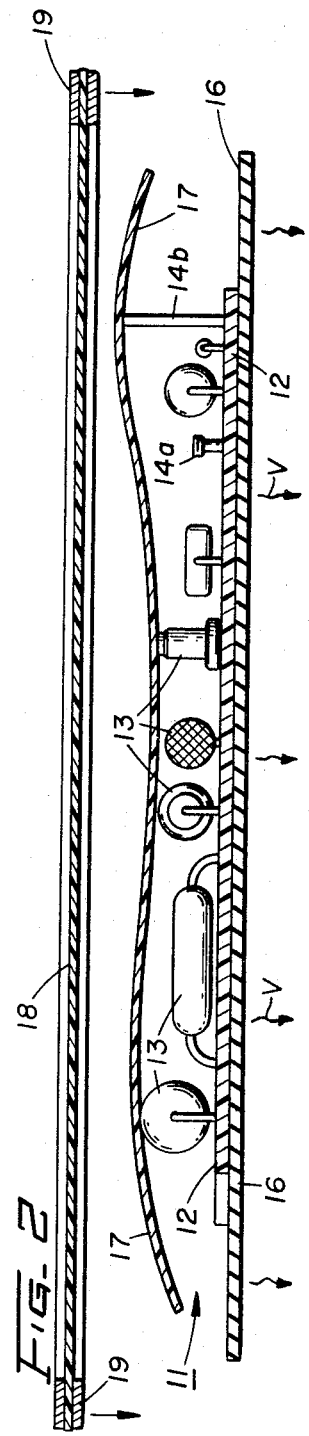
INVENTORS
R. A. COSIER
A. K. McDONNELL

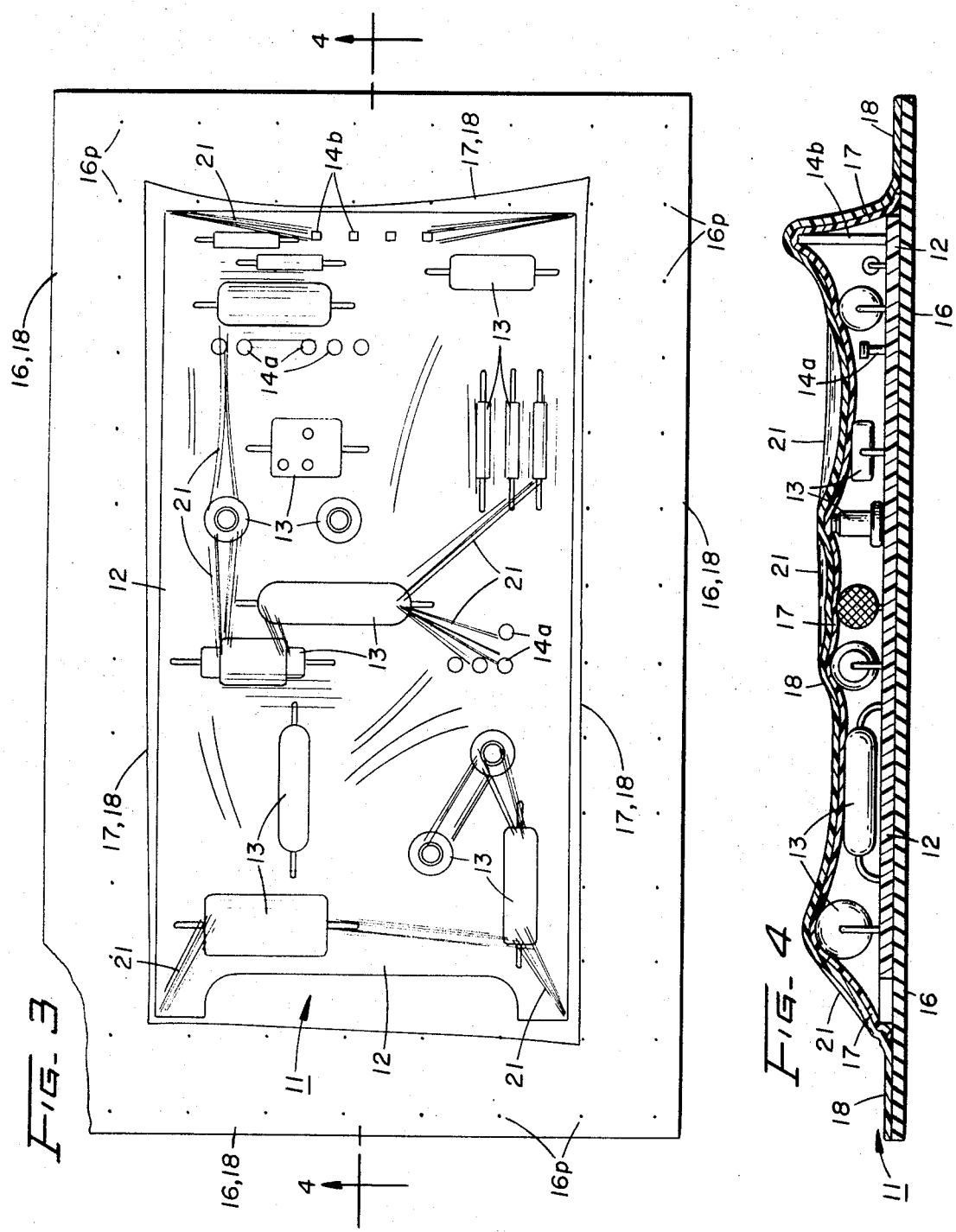

SKIN PACKAGE FOR AN ARTICLE AND METHOD OF FORMING THE PACKAGE

BACKGROUND OF THE INVENTION

1. Field of the Invention

This invention relates to the skin packaging of articles and more particularly to the skin packaging of articles having a plurality of irregular protrusions on at least one side thereof.

2. Description of the Prior Art

The packaging of articles in industry, such as for commercial sale or for shipment between locations for additional manufacturing operations, can be conveniently accomplished utilizing a process known as "skin packaging." In one form of this process an article is positioned on an air-pervious backing member and a heated film of thermoplastic material is placed over the article and the backing member. A vacuum then is applied to the backing member to draw the film down into tight-fitting engagement with the article and into bonded engagement with the backing member.

As the film is drawn down onto the article and the backing member, however, the film tends to stretch and thin out, particularly about the periphery of the article. This stretching and thinning also occurs when the article includes a substantial number of irregular protrusions and/or cavities which can be engaged by the film. The film may even stretch to the point where it ruptures, producing a hole in the package. In any event, as a result of the thinning of the film material the resultant package is highly susceptible to being broken or punctured, thereby exposing the article to possible damage.

To preclude excessive drawdown of the thermoplastic film, it has been proposed that a barrier film of thermoplastic material be bonded to the backing member prior to positioning the article thereon. A heated cover film then is drawn down over the article by a vacuum through the backing member and barrier film, and is bonded to portions of the barrier film. For heavier articles, it also has been proposed that the size of the barrier film be made smaller than the backing member so that portions of the heated cover film can be bonded both to portions of the barrier film and directly to portions of the backing member.

These prior known systems, however, are not effective in precluding excessive drawdown of the heated cover film where the article has a number of irregular, relatively sharp protrusions thereon. In this connection, since the heated cover film is extremely plastic it tends to envelope or encapsulate the protrusions and to form into any cavities in the article. There also is a tendency for the heated cover film to bond to the article. This, combined with the excessive drawdown of the cover film, makes the subsequent removal of the article from the skin package extremely difficult, and may result in damage to the article during its removal. Further, where the article being packaged is extremely sensitive to heat, since the heated cover film comes into direct contact with the article, there is a danger of excessive heat transfer from the heated film to the article and damage thereof.

SUMMARY OF THE INVENTION

An object of this invention is to provide a new and improved skin package for an article and method of forming the package.

Another object of this invention is to provide a new and improved skin package for an article and method of the vacuum-bonding type in which excessive drawdown and enveloping or encapsulating of portions of the article by a cover film are substantially precluded.

A further object of this invention is to provide a new and improved skin package for an article and method of the vacuum-bonding type in which difficulty in subsequent removal of the article from the package is substantially reduced.

A still further object of this invention is to provide a new and improved skin package for an article and method of the vacuum-bonding type in which the package is of stronger construction and has greater penetration resistance than prior known skin packaging configurations.

Another object of this invention is to provide a new and improved skin package for an article and method of the vacuum-bonding type which combines the high strength and penetration resistance of a relatively thick film with the superior bonding capability of a relatively thin film.

Another object of this invention is to provide a new and improved skin package for an article and method which provides a strength and rigidity of a preformed film cover with the versatility of a skin packaging process of the vacuum-bonding type.

A further object of this invention is to provide a new and improved method of skin packaging an article in which the danger of heat damage to the article is substantially reduced.

A still further object of this invention is to provide a new and improved method of skin packaging an article in which the problem of a cover film bonding to the article is substantially eliminated.

In accordance with this invention, an article is packaged by positioning the article on an air-pervious backing member and then positioning a relatively cool inner sheet of substantially fluid-impervious material over the article. A relatively hot outer sheet of substantially fluid-impervious material then is positioned over the inner sheet and a vacuum is applied to the backing member to draw the two sheets into tight-fitting relationship with respect to the article. At the same time the vacuum draws portions of the relatively hot sheet of material into engagement with portions of the backing member and the hot sheet is bonded to the backing member.

More specifically, the relatively cool inner sheet of material has initial side dimensions which are greater than the corresponding side dimensions of the article, and the relatively hot outer sheet of material has initial side dimensions which are greater than the corresponding initial side dimensions of the inner sheet. Further, the article is positioned on the backing member on one side thereof so that the backing member projects beyond the periphery of the article, and the vacuum is applied to the opposite side of the backing member. In the finished package, the relatively cool inner sheet of material extends into engagement with the backing member about substantially the entire periphery of the article, and the relatively hot outer sheet of material is bonded to the projecting portions of the backing member about substantially the entire periphery of the article. The two sheets of packaging material also are integrally bonded together and tend to form reinforcing ribs between certain of the protrusions on the article, and between these protrusions and the periphery of the article.

BRIEF DESCRIPTION OF THE DRAWINGS

FIG. 1 is a plan view illustrating the relative sizes and positions of an article, a backing member and associated inner and outer cover films prior to encapsulating the article in a skin package in accordance with the invention.

FIG. 2 is a cross-sectional view taken along the line 2—2 in FIG. 1.

FIG. 3 is a plan view of the article shown in FIG. 1 after the article has been encapsulated in a skin package in accordance with the invention; and FIG. 4 is a cross-sectional view taken along the line 4—4 of FIG. 3.

DETAILED DESCRIPTION

Referring to FIGS. 1 and 2, the disclosed embodiment of the invention relates to the skin packaging of an electrical assembly 11 which includes a printed circuit board 12 having a printed circuit (not shown) formed upon its underside and having electrical components 13 in the form of resistors, capacitors and transistors secured to the board in a conventional manner and projecting from its upper side. The printed circuit board 12 also is provided with a plurality of upstanding terminals 14a and b, with the terminals 14b being located adjacent the right hand end of the board, as viewed in FIGS. 1 and 2, and projecting substantially above the other terminals 14a. Thus, the electrical assembly 11 has a plurality of upstanding irregular protrusions on its component side, making it difficult to encapsulate by prior known skin packaging methods.

In accordance with this invention, the electrical assembly 11 is skin packaged on a backing member 16 utilizing a relatively cool inner cover sheet 17 and a heated outer cover sheet 18. The backing member 16 is of a suitable air-pervious material, such as chipboard or corrugated fibreboard, and the two cover sheets 17 and 18 are of a fluid-impervious, transparent, formable thermoplastic material, such as polyethylene film. The backing member 16 is provided with a plurality of perforations 16p extending therethrough, to facilitate the bonding of the heated outer cover sheet 18 to the backing member. In addition, or as an alternative, the top of the backing member 16 may be precoated with a suitable heat sensitive adhesive, such as pyroxlin.

In encapsulting the electrical assembly 11, the electrical assembly is positioned on the top of the backing member 16, and the inner cover sheet 17, at room temperature, is positioned over the component side of the electrical assembly as shown in FIGS. 1 and 2. Next, the heated outer cover sheet 18 is moved vertically downward over the cool inner cover sheet 17, as indicated by the arrows in FIG. 2, and a vacuum V is applied beneath the backing member 16. The vacuum simultaneously draws the two cover sheets 17 and 18 down into tight-fitting relationship with respect to the tops of various ones of the components 13 and the terminals 14a and b on the printed circuit board 12, and also draws peripheral portions of the heated cover sheet 18 into firm engagement with the backing member 16 around the entire periphery of the printed circuit board, as illustrated in FIGS. 3 and 4. Preferably, these steps are carried out in conventional skin-packaging apparatus of the vacuum bonding type in which material for the cover sheet 18 is supported in a vertically movable heating frame 19 (FIG. 2) and is fed into the heating frame from a continuous supply (not shown).

The engagement of the heated outer cover sheet 18 with the cool inner cover sheet 17 causes the two sheets to become integrally bonded to one another to form a one-piece cover member for the electrical assembly 11. In this connection, since the cool inner cover sheet 17 precludes the heated outer cover sheet 18 from directly engaging the electrical assembly 11, the outer cover sheet can be heated to a relatively high temperature whereby it will readily bond to the inner cover sheet upon coming into engagement therewith. Similarly, as the peripheral portions of the relatively hot outer cover sheet 18 are drawn into engagement with the backing member 16, if the backing member includes the perforations 16p, the heated sheet bonds to the backing member around the entire periphery of the printed circuit board 12, with portions of the cover sheet being sucked into the perforations to anchor the sheet securely to the backing member. Further, if the backing member 16 is precoated with a heat sensitive adhesive, the adhesive is activated by the heated sheet 18 to bond the sheet to the backing member.

The relative sizes of the electrical assembly 11, the backing member 16 and the two cover sheets 17 and 18, prior to encapsulation, are illustrated in FIGS. 1 and 2. The side dimensions of the backing members 16, that is, its length and width, are greater than those of the printed circuit board 12 so that the backing member projects beyond the periphery of the board when the board is positioned thereon. The length and width of the inner cover sheet 17 preferably are such that when it is pulled down onto the electrical assembly 11, the edges of the sheet will extend at least into engagement with the backing member 16 as illustrated in FIG. 4, to preclude excessive drawdown of the heated outer cover sheet 18 adjacent the periphery of the printed circuit board 12. Otherwise, the heated outer cover sheet 18 may become overstretched and thinned out so as to rupture or to be susceptible to breakage or being punctured in this area. In this connection, while the minimum length and width of the inner cover sheet 17 which should be used to achieve this construction will vary depending on the configuration of the article being packaged, they can be determined approximately by taking the length and width of the article (printed circuit board 12) and adding twice the height of the tallest protrusion (terminals 14b) on the article to each of these dimensions, respectively. The proper position of the inner cover sheet 17 on the article, and any desired adjustments in its length and width, then can be determined by trial and error. For example, while normally the inner cover sheet 17 will be substantially centered over the article, in the illustrated embodiment of the invention, in view of the extreme height of the terminals 14b at one end of the printed circuit board 12, the inner cover sheet is shown as being off-set to the right in FIGS. 1 and 2.

As is apparent from FIGS. 1 and 2, the initial length and width of the outer cover sheet 18 are larger than the length and width, respectively, of the inner cover sheet 17, so that the outer cover sheet can engage and become bonded to portions of the backing member 16 around the entire periphery of the printed circuit board 12 as shown in FIGS. 3 and 4. In this connection, the internal length and width dimensions of the heating frame 19 in which the outer cover sheet 18 is supported, preferably are slightly larger than the length and width dimensions of the backing member 16, to facilitate the movement of the heating frame and the cover sheet downward relative to the backing member during the vacuum bonding process. Subsequently, any excess cover sheet material may be trimmed from around the periphery of the backing member 16, as necessary.

As the two cover sheets 17 and 18 are drawn down onto the electrical assembly 11 in the vacuum bonding operation, the cool inner cover sheet 17 precludes the hot outer cover sheet 18 from coming into direct contact with the assembly. Accordingly, since the cool inner cover sheet 17 is at room temperature and relatively inelastic, it limits the tendency of the hot outer cover sheet 18 to stretch and to thin out adjacent the periphery of the printed circuit board 12, and between the projecting component 13 and terminals 14. The cool inner cover sheet 17 also precludes the hot outer cover sheet 18 from enveloping or encapsulating the projecting components 13 and terminals 14, which would make subsequent removal of the electrical assembly 11 extremely difficult. In this regard, while the inner cover sheet 17 is heated by the outer cover sheet 18 so that the two sheets become bonded together, its inner surface is not heated sufficiently to cause the sheet to become bonded to the printed circuit board 12, the components 13, the terminals 14 or the backing member 16. At the same time the inner cover sheet 17 functions as a heat barrier to preclude heat damage to the electrical assembly 11 by the relatively hot outer cover sheet 18.

The part of the one-piece cover member formed by the superimposed portions of the two integrally bonded cover sheets 17 and 18 is substantially double the thickness of one of the sheets, whereby the cover member has relatively great strength and penetration resistance. Further, as the two sheets 17 and 18 are pulled down over the components 13 and the terminals 14 in the encapsulating process, they tend to form "tents" or ribs 21 between the projections defined by the higher components and terminals, and between these projections and the periphery of the printed circuit board 12, as illustrated in FIGS. 3 and 4. The thus formed ribs 21 act to reinforce the cover member formed by the two sheets 17 and 18. Accordingly, the subject invention produces a skin package configuration of great strength and pentration resistance; however, only a single thickness of material, in the form of the outer cover sheet 18, need be heated and bonded to the backing member 16, which is advantageous since it is well known in the art that a relatively thin sheet of material normally is easier to heat, manipulate and bond, than a realtively thick sheet of material.

Summarizing, a skin package and a method of forming it have been disclosed in which the skin packaging of an article having irregular protrusions on one side, such as the electrical assembly 11, readily can be accomplished. The method involves positioning the electrical assembly 11 on top of the backing member 16 and then placing the inner cover sheet 17, at room temperature, over the component side of the electrical assembly 11, as shown in FIGSS. 1 and 2. Next, the heated outer cover sheet 18 is moved downward over the relatively cool inner sheet 17 and vacuum is applied beneath the backing member 16 to draw the two cover sheets down into tight-fitting relationship with respect to the electrical assembly 11, as shown in FIGS. 3 and 4. At the same time the heated outer cover sheet 18 bonds to the cool inner cover sheet 17, and bonds to the backing member 16 about the entire periphery of the printed circuit board 12 of the assembly, to encapsulate the assembly in an integral one piece cover member of double thickness and having reinforcing "tents" or ribs 21. The encapsulation of the electrical assembly 11 may readily be accomplished in standard skin packaging apparatus, without excessive stretching and thinning of the cover sheets 17 and 18, without enveloping or encapsulating the components 13 and the terminals 14, without bonding of the cover sheets 17 and 18 to the electrical assembly 11, and without heat damage to the assembly. Thus, the resultant package configuration possesses great strength and penetration resistance, and the electrical assembly 11 can readily be removed therefrom in an undamaged condition.

What is claimed is:

1. A package for an article, which comprises:
   an air-pervious backing member in engagement with one side of the article;
   an inner layer of fluid-impervious material in tight-fitting engagement with an opposite side of the article; and
   an outer layer of fluid-impervious material integrally bonded to said inner layer of material and having portions extending beyond said inner layer of material and vacuum bonded to said backing member to retain said layers of material in fixed relationship relative to the article.

2. A package for an article, as recited in claim 1, in which:
   said inner layer of material extends into engagement with the backing member about substantially the entire periphery of the article.

3. A package for an article, as recited in claim 1, in which the side of the article with which the inner layer of material is engaged includes a plurality of irregular protrusions, and in which:
   said integrally bonded layers of material form reinforcing ribs between the protrusions and between the protrusions and the periphery of the article.

4. A package for an article, which comprises:
   an air-pervious backing member in engagement with one side of the article;
   a fluid-impervious covering in tight-fitting engagement with the opposite side of the article and having portions extending beyond the periphery of the article and vacuum bonded to said backing member, substantially the entire portion of said covering up to the periphery of the article being of substantially greater thickness than the portions of said covering which extend beyond the periphery of the article and which are bonded to said backing member.

5. The method of packaging an article, which comprises:
   positioning the article on a backing member;
   positioning a relatively cool inner sheet of formable material over the article;
   positioning a relatively hot outer sheet of formable material over the relatively cool inner sheet of material at a temperature such that the hot outer sheet is heat-bondable to the backing member;

simultaneously forming the two sheets of material into tight-fitting relationship with respect to the article; and heat-bonding portions of the relatively hot sheet of material to the backing member.

6. The method of packaging an article, which comprises:

positioning the article on an air-pervious backing member;

positioning a relatively cool inner sheet of formable substantially fluid-impervious material over the article;

positioning a relatively hot outer sheet of formable substantially fluid-impervious material over the relatively cool inner sheet of material at a temperature such that the hot outer sheet is heat-bondable to the backing member;

applying a vacuum to the backing member to draw the two sheets of material into tight-fitting relationship with respect to the article simultaneously; and heat-bonding the relatively hot sheet of material to the backing member.

7. The method of packaging an article, as recited in claim 6, which further comprises:

predimensioning the relatively cool inner sheet of material so that the sheet has initial side dimensions which are greater than the corresponding side dimensions of the article; and predimensioning the relatively hot outer sheet of material so that the sheet has initial side dimensions which are greater than the corresponding initial side dimensions of the relatively cool inner sheet of material.

8. The method of packaging an article, as recited in claim 6 in which:

the article is positioned on one side of the backing member so that the backing member projects beyond the periphery of the article;

the vacuum is applied to an opposite side of the backing member to draw the two sheets of material into tight-fitting relationship with respect to the article and to draw portions of the relatively hot sheet of material into engagement with portions of the one side of the backing member; and the engaged portions of the relatively hot sheet of material and the backing member are bonded together.

9. The method of packaging an article, as recited in claim 6, in which:

the two sheets are of fluid-impervious thermoplastic material.

10. The method of skin packaging an article having a plurality of irregular protrusions on one side thereof, which comprises:

positioning the article on one side of an air-pervious backing member with the protrusions on the one side of the article facing outward relative to the backing member and so that the backing member projects beyond the periphery of the article;

positioning a relatively cool inner sheet of formable substantially fluid-impervious material, having initial side dimensions which are greater than the corresponding side diemensions of the article, over the one side of the article;

positioning a relatively hot outer sheet of formable substantially fluid-impervious material having a temperature such that it is heat-bondable to the backing member, and having initial side dimensions which are greater than the corresponding initial side dimensions of the relatively cool inner sheet of material, over the relatively cool inner sheet of material;

applying a vacuum to an opposite side of the backing member to draw the two sheets of material into tight-fitting relationship with respect to the article simultaneously and to draw portions of the relatively hot sheet of material into engagement with portions of the one side of the backing member; and heat-bonding the portions of the relatively hot outer sheet of material to the portions of the one side of the backing member about substantially the entire periphery of the relatively cool inner sheet of material and the article.

11. The method of packaging an article, as recited in claim 10, in which:

the relatively cool inner sheet of material is precut so that each initial side dimension of the sheet is not substantially less than the sum of the corresponding side dimension of the article plus twice the height of the highest protrusion on the one side of the article.

12. The method of packaging an article, which comprises:

positioning a relatively cool inner sheet of formable substantially fluid-impervious material in engagement with the article;

positioning a relatively hot outer sheet of formable substantially fluid-impervious material over the relatively cool inner sheet of material at a temperature such that the hot outer sheet is heat-bondable to the cool inner sheet; and applying a vacuum to the two sheets of material simultaneously to draw the sheets into tight-fitting relationship relative to the article and to bond the two sheets of material together and in a fixed position relative to the article.

13. The method of packaging a board having a plurality of projecting components, which comprises:

placing the board on a backing member constructed of air-pervious material, said backing member having sufficient width and length to extend beyond the periphery of the board;

placing an inner sheet of thermoplastic formable material, at room temperature, over the board and projecting components, said inner sheet having sufficient width and length to provide a peripheral section that extends beond the periphery of the board but not to the periphery of the backing member;

placing a hot outer sheet of thermoplastic formable material having a temperature sufficient to render it heat-bondable to the inner sheet and the board, over the inner sheet, said outer sheet having sufficient width and length to provide a peripheral section that extends beyond the periphery of the inner sheet to the proximate periphery of the backing member; and applying vacuum through the air-pervious backing member to simultaneously draw the inner and outer sheets onto the projecting components and to draw the extending peripheral sections of the sheets into firm engagement with the backing member, to bond the hot outer sheet to the inner sheet and to bond the extending peripheral section of the hot outer sheet to the backing member.

* * * * *